March 16, 1926.  
S. G. RICHARDS  
SLED  
Filed March 24, 1924  
1,577,078
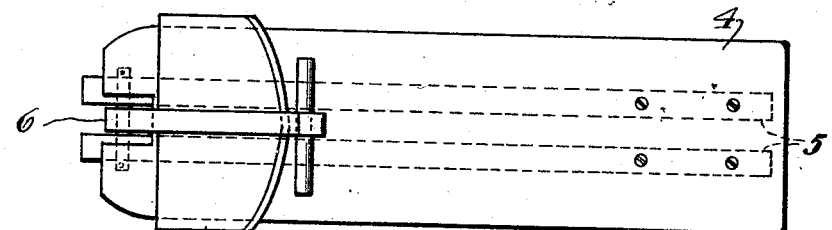
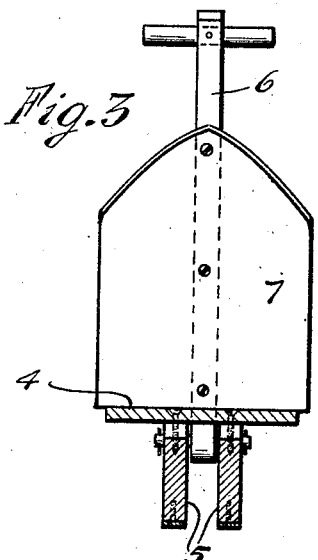
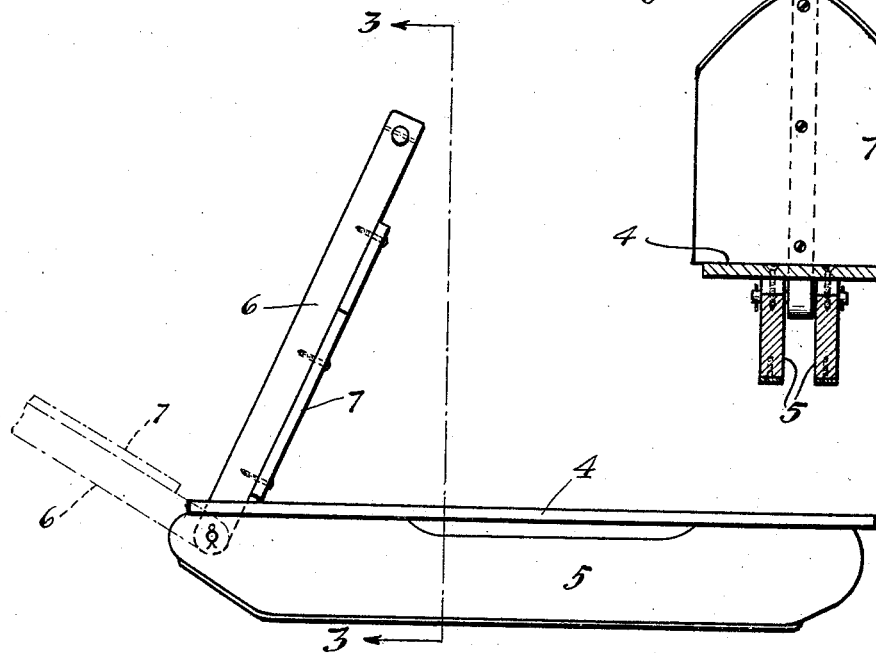
Witnesses:
Inventor:  
Silas G. Richards  
By Joshua R. H. Potts  
His Attorney.

Patented Mar. 16, 1926.

1,577,078

UNITED STATES PATENT OFFICE.

SILAS G. RICHARDS, OF EVANSTON, ILLINOIS, ASSIGNOR OF ONE-HALF TO EDWARD A. BRUEGEL, OF CHICAGO, ILLINOIS, AND ONE-HALF TO JOSEPH STOCKBRIDGE, OF CHICAGO, ILLINOIS.

SLED.

Application filed March 24, 1924. Serial No. 701,430.

*To all whom it may concern:*

Be it known that I, SILAS G. RICHARDS, a citizen of the United States, and a resident of Evanston, county of Cook, and State of Illinois, have invented certain new and useful Improvements in Sleds, of which the following is a specification.

My invention relates to improvements in sleds, and has for its object the provision of an improved construction of this character especially adapted for use by children, which is of simple construction and efficient in use.

Other objects will appear hereinafter.

The invention consists in the combinations and arrangements of parts hereinafter described and claimed.

The invention will be best understood by reference to the accompanying drawing, forming a part of this specification, and in which Fig. 1 is a top plan view of a construction embodying the invention;

Fig. 2 is a side view of the same, and

Fig. 3 is a section taken on line 3—3 of Fig. 2.

The preferred form of construction, as illustrated in the drawing, comprises a sled top 4 provided with runners 5 arranged on the under side closely adjacent each other. A tongue 6 is pivotally mounted between the forward ends of the runners 5 and swings upwardly through a slot in the sled top 4, as shown. The tongue 6 is formed from a bar of a size to fit loosely between the runners 5, said runners being spaced apart a distance slightly greater than the width of said bar, and a pivot pin is extended between the runners 5 and through the said bar of said tongue. A shield 7 is secured to the tongue 6 in position to act as a windshield for an occupant of the sled and also to contact with the top of the sled to limit the upward swing of said top.

By this arrangement a simple and effective construction is provided for the purpose. Owing to the fact that the runners 5 are positioned closely adjacent to each other the sled may be operated on a comparatively narrow surface, will offer little resistance to such operation, and may be readily steered by manipulating the tongue 6. By means of the arrangement disclosed a very simple and effective mounting for the tongue is provided and one which puts the runners directly under the control of the tongue relieving the top of the sled from practically all strain in steering. When the tongue is drawn rearwardly it causes the shield 7 to contact with the sled top, and an interlocking arrangement is effected whereby the tongue, the shield, the sled top and the runners all become practically one rigid construction and therefore readily steered by manipulating the tongue, a result which is further facilitated by arranging the runners closely adjacent each other.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A sled comprising a top having a central slot in the forward portion thereof; runners under said top and closely adjacent each other; a tongue having a bar fitting loosely between said runners and arranged to operate in said slot, the runners being spaced a distance apart slightly greater than the width of said bar; a pivot pin extending between said runners and through said bar; and a shield on said bar arranged to contact with the sled top when the tongue is swung upwardly and rearwardly substantially as described.

2. A sled comprising a top having a central slot at its forward end; runners under said top and closely adjacent each other; a tongue pivoted between said runners and arranged in said slot; and a shield on said tongue arranged to contact with the sled top when said tongue is swung upwardly and rearwardly, substantially as described.

In testimony whereof I have signed my name to this specification.

SILAS G. RICHARDS.